United States Patent [19]

Wilson

[11] Patent Number: 4,525,011
[45] Date of Patent: Jun. 25, 1985

[54] VIGILANCE SAFETY CONTROL SYSTEM
[75] Inventor: Richard L. Wilson, Monroeville, Pa.
[73] Assignee: American Standard Inc., Wilmerding, Pa.
[21] Appl. No.: 420,197
[22] Filed: Sep. 20, 1982
[51] Int. Cl.$^3$ ............................................. B60T 7/14
[52] U.S. Cl. ..................................................... 303/19
[58] Field of Search .................. 303/19, 20; 246/186, 246/187 R, 167 R

[56] References Cited
U.S. PATENT DOCUMENTS

| | | | |
|---|---|---|---|
| 3,136,585 | 6/1964 | Edmund | 303/19 |
| 3,136,586 | 6/1964 | Rush | 303/19 |
| 3,160,445 | 12/1964 | Wilson | 303/19 |
| 4,165,136 | 8/1979 | Erlbeck | 303/19 |

Primary Examiner—Bruce H. Stoner, Jr.
Assistant Examiner—Alvin Oberley
Attorney, Agent, or Firm—J. B. Sotak

[57] ABSTRACT

A pneumatic vigilance monitoring system which requires an engineer of a moving train to cycle an acknowledging valve within a predetermined time after the sounding of a warning whistle. The system includes a pair of parallel control circuits each having a first choke and reservoir and a second reservoir and choke connected to the acknowledging valve. A double check valve connects the second reservoirs to the warning whistle as well as to a piloted three-way valve which normally causes a brake application valve to release the brake and which causes the brake application to initiate a penalty brake application if the locomotive engineer fails to periodically cycle the acknowledging valve.

8 Claims, 3 Drawing Figures

VIGILANCE SAFETY CONTROL SYSTEM

FIELD OF THE INVENTION

The invention relates to a safety control system, and more particularly to a pneumatic vigilance monitoring arrangement which requires an alert operator of a moving vehicle to take positive action by initiating a periodic cycling operation in order to prevent a penalty brake application, namely, the application of a full service brake which brings the vehicle to a complete stop.

BACKGROUND OF THE INVENTION

It is common practice in railroad and mass and/or rapid transit operations to constantly check the alertness of the locomotive engineer or trainman by requiring him to perform a certain repetitive task as the train moves along its route of travel. Presently, a pneumatic cycling valve is used in railroad applications as a means of requiring the train operator to periodically acknowledge his attentiveness by alternately activating a foot pedal spool valve device in order to suppress a penalty brake application. In requiring such periodic acknowledgement, the operator is unable to circumvent the safety system by simply placing a weight on the foot pedal valve to maintain it in a depressed closed position to provide a false indication of his watchfulness. However, the use of a pneumatic cycling spool valve type of vigilance safety control system entails moving parts and O-ring seals which are susceptible to wear and leakage problems. Thus, the previous cycling control systems not only were costly to manufacture and maintain, but also were relatively short-lived and troublesome.

OBJECTS OF THE INVENTION

Accordingly, it is an object of this invention to provide a new and improved cycling type of safety control system for checking the alertness of an operator of a moving vehicle.

A further object of this invention is to provide a unique vigilance control system which requires periodic cycling by a trainman.

Another object of this invention is to provide an improved alert monitoring control arrangement which periodically checks the attentiveness of a locomotive engineer.

Still a further object of this invention is to provide a novel periodic cycling safety control system which necessitates an operator to institute a timely operation in order to prevent a penalty braking application.

Still another object of this invention is to provide a new safety control system which requires a trainman to initiate a periodic acknowledgement in order to suppress the application of a full service brake.

Yet a further object of this invention is to provide a safety control system for checking the alertness of an operator of a moving vehicle comprising, first and second parallel fluid circuits each housing a first and a second reservoir, a reversing valve cooperatively associated with the first and second reservoirs of each circuit for selectively and alternately interconnecting the first reservoir to the second reservoir of each circuit, and means responsive to the pressure in the second reservoirs of each circuit for causing a penalty brake application when the operator fails to acknowledge a warning signal by switching the reversing valve within a predetermined time.

Yet another object of this invention is to provide a new and improved pneumatic vigilance monitoring arrangement which is simple in design, economical in cost, reliable in operation, easy to manufacture, durable in use and efficient in service.

SUMMARY OF THE INVENTION

Briefly, in accordance with the present invention there is provided a unique safety control system for monitoring the attentiveness of an engineer of a railway train. The system includes a pair of alternate parallel charging circuits for controlling the operation of a single pilot, three-way valve which controls a brake application valve. Each of the parallel charging circuits includes a first choke valve connected to a pressure source and to the input of a first volume reservoir. The output of each of the first volume reservoirs is connected to the respective input ports of a two-way, acknowledging reversing valve which is selectively switched between a first and a second position. The respective output ports of the two-way valve are connected to the inputs of a second pair of volume reservoirs. A second choke valve is connected to each of the second volume reservoirs to slowly bleed off the pressure. The output of each of the second volume reservoirs is connected to a double check valve which is connected to a warning whistle and the pilot port of the single-piloted, three-way valve. The single-piloted, three-way valve includes a supply port, an exhaust port as well as a delivery port which is connected to the foot valve port of the brake application valve. Once the train is underway, the engineer must periodically cycle or reverse the acknowledging valve within a predetermined time after the warning whistle is sounded in order to prevent the pressure in either of the second volume reservoirs from exceeding the trigger level of the pilot valve which would cause the brake application valve to initiate a penalty brake application.

BRIEF DESCRIPTION OF THE DRAWINGS

The above objects and other attendant features and advantages will become more readily appreciated as the subject invention becomes better understood by reference to the following detailed description when considered in conjunction with the accompanying drawings, wherein.

DETAILED DESCRIPTION OF THE INVENTION

Figure 1:
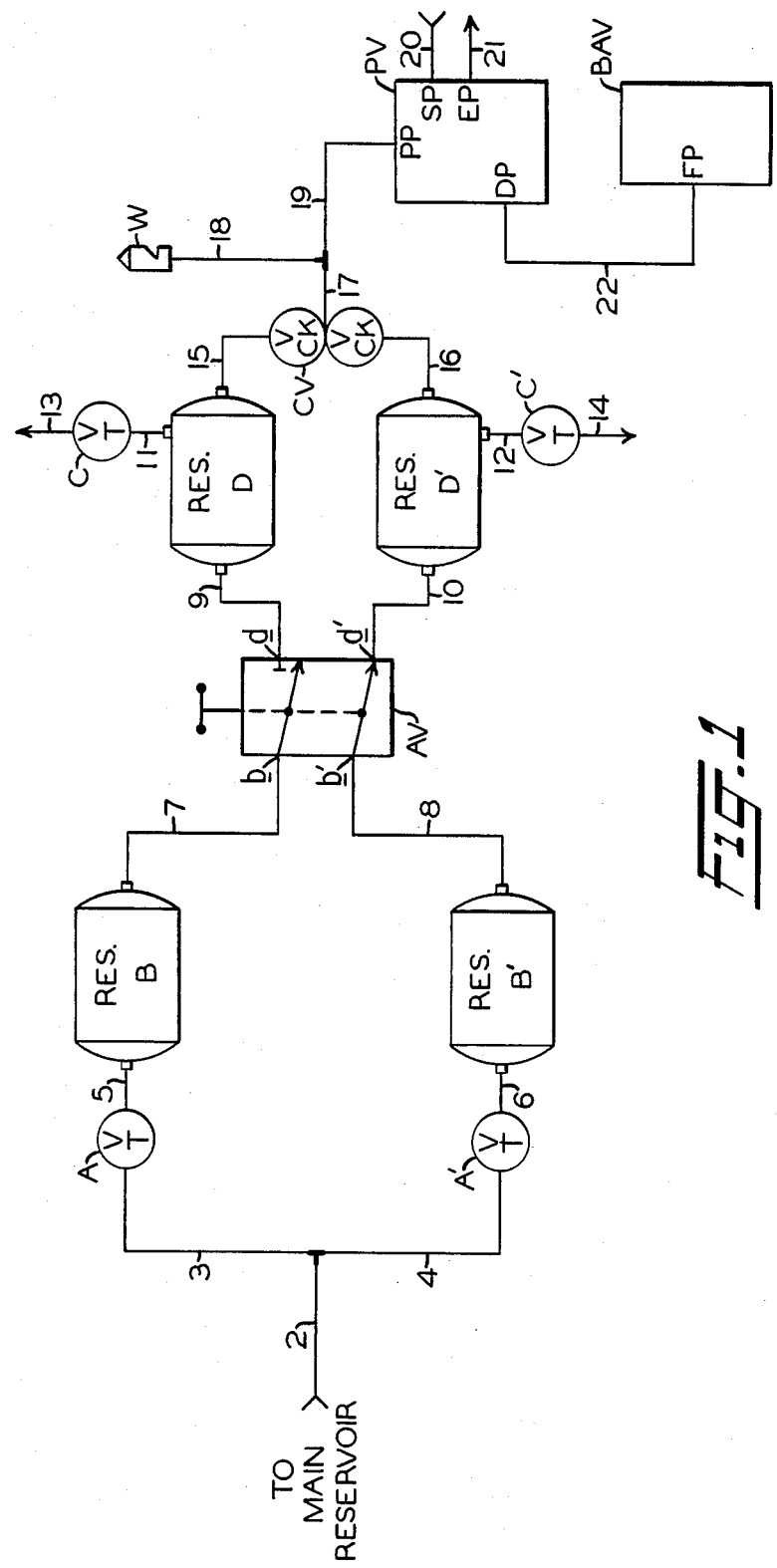
FIG. 1 is a schematic diagram of a safety control system according to the present invention in which an operator of a locomotive must periodically acknowledge his alertness to suppress a penalty brake application.

Referring to the drawings, and in particular to FIG. 1, there is shown the safety control apparatus which may be provided on a railway locomotive or a lead transit vehicle for checking the attentiveness of an engineer or operator. As shown, a source of fluid pressure, such as a main supply reservoir, is connected to a supply pipe 2 which feeds parallel branch pipes 3 and 4. The pipe 3 is connected to a choke or throttle valve device A while the pipe 4 is connected to a choke or throttle valve A'. The choke valve A is connected to the input of a first volume reservoir B via pipe 5 while the choke valve A' is connected to the input of a first volume reservoir B' via pipe 6. The output of reservoir B is connected to one input port b of a two-way acknowledging reversing or switching valve AV via pipe 7 while the input port b' of the reservoir B' is connected to the other input port b' of valve AV via pipe 8. The acknowledging valve AV may take the form of a foot pedal or hand lever fluid switching device which is conveniently located within easy reach of the operator so that he may quickly manipulate valve to the respective positions. It will be seen that one output port d of valve AV is connected to the input of a second volume reservoir D via pipe 9 while the other output port d' of valve Av is connected to the input of a second volume reservoir D' via pipe 10. As shown, the reservoir D is vented to atmosphere via pipe 11, choke or throttle valve C, and pipe 13 while the reservoir D' is vented to atmosphere via pipe 12, choke or throttle valve C' and pipe 14. The output of reservoir D is connected to one end of a double check valve CV via pipe 15 while the output of the reservoir D' is connected to the other end of the double check valve CV via pipe 16. The output of the check valve CV is connected by pipe 17 to pipes 18 and 19. Thus, two parallel control circuits are formed between supply pipe 2 and outlet pipe 17, namely, a first circuit made up of pipe 3, valve A, pipe 5, reservoir B, pipe 7, ports b and d of valve AV, pipe 9, reservoir D, pipe 11, valve C, pipes 13 and 15, and one side of the double check valve CV, and a second circuit made up of pipe 4, valve A', pipe 6, reservoir B', pipe 8, ports b' and d' of valve AV, pipe 10, reservoir D', pipe 12, valve C', pipes 14 and 16, and the other side of the double check valve CV. The pipe 18 is connected to an impending penalty warning whistle W while the pipe 19 is connected to the pilot port PP of a pneumatic, single-piloted, three-way valve PV which can change the flow of air between the supply port SP, the exhaust port EP and the delivery port DP in accordance with the air pressure that is in a chamber above a diaphragm. The supply port SP is connected to the main reservoir or the like via pipe 20 while exhaust port EP is vented to atmosphere via pipe 21. The delivery port DP of valve PV is connected by pipe 22 to the foot valve port FP of brake application valve BAV which controls the brake line pressure to the brake cylinders. During normal brake release operation, air flows from the main reservoir to the brake line to cause the brake cylinders to release the brakes. Conversely, during a penalty brake application the air pressure in the foot pipe is exhausted so that the brake application valve BAV causes the brake cylinders to initiate a full service brake condition.

Figure 2:
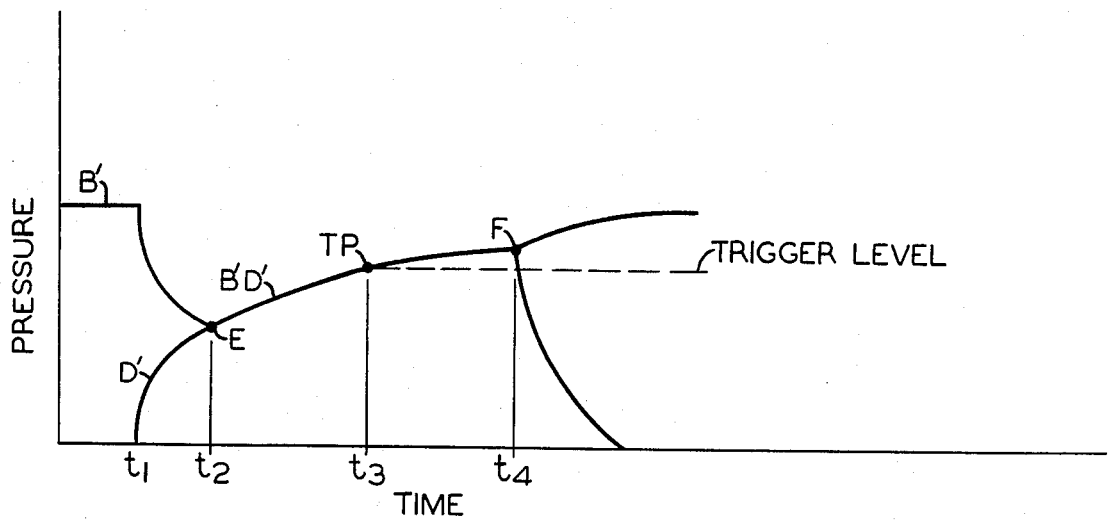
FIGS. 2 and 3 are graphical illustrations of the pressure time curves which will be of assistance in more readily understanding the operation of the safety control system of FIG. 1.

Now let us assume that the apparatus is intact and operating properly and that the acknowledging valve AV has just been switched to the position as shown in FIG. 1 so that communication is established between ports b' and d'. Under this condition port b no longer is in communication with port d, but is blocked off. Since port b' was previously blocked off, the first volume reservoir B' had a chance to build up to the pressure of the main reservoir while the pressure in the second volume reservoir D' was bled off through the choke valve C'. Thus, the pressure in reservoir B' is initially at level B' as shown in FIG. 2 while the pressure in reservoir D' is a zero so that when the valve AV is switched at time t, the reservoirs B' and D' begin to equalize due to the established communication between ports b' and d'. At time $t_2$, the pressures in reservoirs become equalized as shown by point E in FIG. 2. Now if the communication between ports b' and d' remains, the pressures in reservoirs B' and D' will begin to build up as shown by curve B'D' since the choke A' will allow more air to be supplied to volume reservoir B' than is being exhausted from reservoir D' via choke C'. That is, the restriction of choke C' is greater than the restriction of choke A', and likewise the obstructive rate of choke valve C is greater than the obstructive rate of choke valve A. At time $t_3$, the pressures in the reservoirs reach a point TP which is the trigger level of the piloted operated valve PV. Since the pressure in reservoir D' is greater than the vented pressure of reservoir D, the pressure in reservoir D' is connected by the double check valve CV to the whistle W and the pilot port PP of valve PV. Normally, the valve PV establishes communication between the supply port SP and delivery port DP so that the pressure in pipe 20 is conveyed to pipe 22 and in turn, to the foot port FP of the brake application valve BAV. However, when the pressure in reservoir D' reaches the trigger level, the pilot valve closes the supply port SP and establishes communication between the delivery port DP and the exhaust port EP. Thus, when the pipe 22 is exhausted, the valve BAV initiates a penalty brake application. In viewing FIG. 2, it will be seen that the pressures in reservoirs B' and D' continue to rise and follow curve B'D' until time $t_4$ when the acknowledging valve AV is switched to its other position. The pressure in volume reservoir B' continues to rise from point F toward the main supply pressure since port b' is blocked off while the pressure in volume reservoir D' begins to decrease from point F toward zero due to the air being bled off through the choke valve C'.

Figure 3:
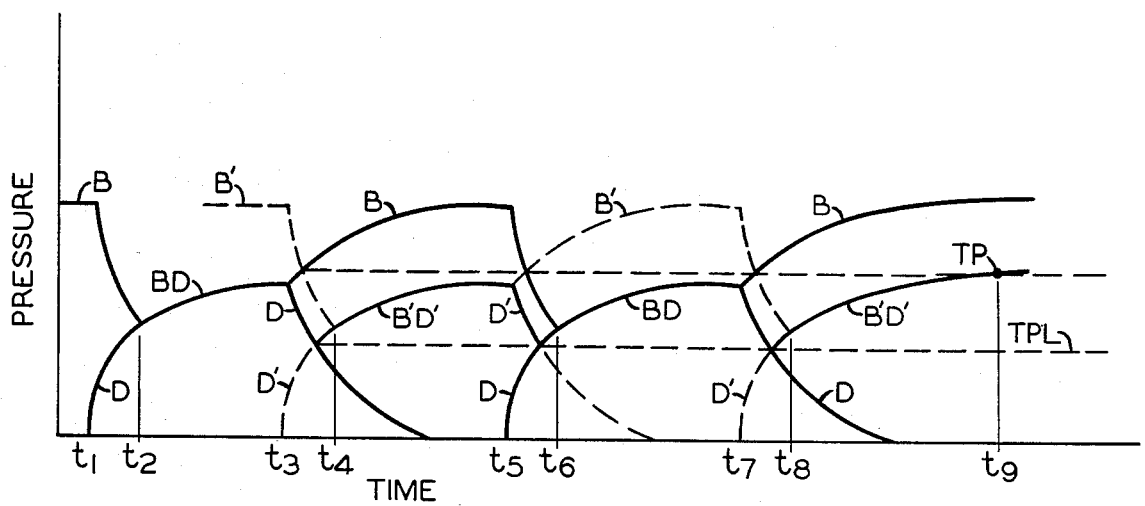

Let us now analyze the curves of FIG. 3, and let us assume that the train is not underway, but is building up pressure that the acknowledging valve AV is in the position as shown in FIG. 1. Thus, the pressure in volume reservoir B builds up to the level B, namely, the pressure of the main supply reservoir, as shown in FIG. 3. In order to get underway, the engineer at time $t_1$ shifts the acknowledging valve AV to its other position wherein ports b and d are in communication and port b' is shut off. Thus, the pressures in reservoirs B and D begin to equalize and at time $t_2$ the pressures B and D are equal. Now the pressures in both reservoirs B and D will begin to increase as shown by curve BD. At a time just prior to time $T_3$, the air pressure flowing from the reservoir D through pipe 15, check valve CV and pipes 17 and 18 is sufficient to cause the whistle to sound an alarm to notify the engineer to switch the acknowledging valve AV back to the position as shown in FIG. 1. In practice, the engineer must actuate the switching valve AV within a predetermined time following the warning whistle in order to avoid a penalty. Thus, when the valve AV is switched at time $t_3$, the air pressure in volume reservoir will continue to increase while the air pressure in reservoir D begins to decrease through choke C to atmosphere. At the same time the pressures in reservoirs B' and D' begin to equalize so that at time $t_4$ pressures B'D' are equal. However, it will be seen prior to time $t_4$ the pressures D' and D intersect at a transfer pressure level TPL after which pressure D' becomes greater than pressure D. The pressures B'D' continue to slowly increase until time $t_5$, when the operator upon hearing the warning whistle W switches the acknowledging valve AV to its opposite position wherein the pressure B' continues toward the main supply while the pressure D' begins to decrease through choke C' to atmosphere. At the same time, the pressures in the reservoirs B and D begin to equalize. Again, the pressures D and D' intersect at the transfer pressure level TPL, after which pressure D becomes greater than pressure D'. Thus, at time $t_5$ pressures BD become equal. The pressures BD continue to slowly increase until time $t_7$, when the engineer upon hearing the warning whistle W switches the acknowledging valve AV to its original position as shown in FIG. 1. This causes the pressure in reservoir B to continue tp build up toward the main supply pressure while the fluid pressure in reservoir D is vented to atmosphere through choke C. At the same time, the pressures in reservoirs B' and D' begin to equalize. Once more, the pressure D' exceeds the pressure D at transfer pressure level TPL. Again, at time $t_8$ pressures B' and D' are balanced. Then the pressures in volume reservoirs B' and D' gradually build up.

Let us now assume that the warning whistle W has sounded and that, for some reason, debilitation or the like, the engineer fails to take any action, namely, does not reverse the acknowledging valve AV within the predetermined time after the warning signal. Thus, the pressures in resevoirs B' and D' will continue to build up to a point TP at time $t_9$ so that pressure in reservoir D' exceeds the trigger level of the pilot valve PV. Hence, sufficient fluid pressure flows through pipe 16, check valve CV, pipes 17, 18 and 19 not only to continue to blow whistle W, but also to trigger the pilot valve PV. Accordingly, the pilot valve shuts off the supply port and exhausts the pipe 22 through ports DP and EP to atmosphere through pipe 21. This causes the brake application valve BAV to institute a penalty by initiating a full service brake application to bring the train to a complete stop.

In order to restart the train the acknowledging valve must be cycled and switched from one position to the other in order to reestablish supply pressure in pipe 22. It will be appreciated if and when the acknowledging valve AV is moved to its opposite position, the pressure in reservoir D' will bleed off through choke C'. Now when pressure D' falls below the trigger level, the pilot valve PV reverts to a position in which the supply port SP is again connected to the delivery port DP. Thus, with the pipe 22 recharged to main supply pressure, the brake valve BAV releases the brakes so that the train proceeds along its route of travel. Again, the engineer must continue to periodically cycle the safety control system by switching the acknowledging switch AV back and forth to alternately activate the parallel control circuits upon hearing the warning whistle in order to prevent a penalty brake application.

It will be appreciated that the corresponding volume reservoirs and choke valves are matched in order to ensure identical cycle times which may be varied dependent upon the size of the reservoirs and the degree of restriction provided by the chokes.

Further, it is within the purview of the present invention to reverse the restrictive rates of the chokes so that rates of chokes A and A' are smaller rather than larger than the rates of chokes C and C'. Under such an arrangement, the pressures in volume reservoirs B and D or B' and D' will decrease after equalization so that the trigger level of the pilot operated valve PV would be set below the equalization pressure level E. Further, it will be understood that under such a condition, the supply and exhaust ports of valve PV would also be reversed so that the supply pipe 20 would be connected to port EP while the exhaust pipe 21 would be connected to port SP.

It will be understood that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

Having thus described my invention, what I claim as new and desire to secure by Letters Patent is:

1. A safety control system for checking the alertness of an operator of a moving vehicle comprising, first and second parallel fluid circuits each having separate first and second reservoirs, an input choke valve is disposed in line with said first reservoir of each circuit to restrict the rate of fluid flow to said first reservoirs and an output choke valve is cooperatively associated with said second reservoir of each circuit to bleed off the pressure in said second reservoirs wherein the fluid flow rate of said input choke valves and the pressure bled off by said output choke valves establish a predetermined cycle time for initiating a warning signal, a reversing valve cooperatively associated with said first and second reservoirs of each circuit for selectively and alternately interconnecting said first reservoir to said second reservoir of each circuit, and means including a pilot valve which directly receives fluid pressure from said second reservoir in each circuit for causing a penalty brake application when the operator fails to acknowledge the warning signal by switching said reversing valve within a predetermined time after the warning signal is initiated.

2. The safety control system as defined in claim 1, wherein said reversing valve includes a pair of input ports connected to the respective outputs of said first reservoirs and a pair of output ports connectable to the respective inputs of said second reservoirs.

3. The safety control system as defined in claim 1, wherein a double check valve is disposed in the output of said second reservoirs.

4. The safety control system as defined in claim 1, wherein said pilot valve has a supply port, a delivery port and an exhaust port.

5. The safety control system as defined in claim 4, wherein said means includes a brake application valve which is connected to said delivery port of said pilot valve.

6. The safety control system as defined in claim 1, wherein a whistle is sounded by the pressure in said second reservoirs to provide said warning signal.

7. The safety control system as defined in claim 1, wherein said reversing valve establishes communication between said first and second reservoirs of said first parallel fluid circuit and interrupts communication between said first and second reservoirs of said second parallel fluid circuit when said reversing valve is moved to a first position.

8. The safety control system as defined in claim 9, wherein said reversing valve interrupts communication between said first and second reservoirs of said first parallel fluid circuit and establishes communication between said first and second reservoirs of said second parallel fluid circuit when said reversing valve is moved to a second position.

* * * * *

UNITED STATES PATENT AND TRADEMARK OFFICE
CERTIFICATE OF CORRECTION

PATENT NO. : 4,525,011
DATED : June 25, 1985
INVENTOR(S) : Richard L. Wilson

It is certified that error appears in the above-identified patent and that said Letters Patent are hereby corrected as shown below:

Column 6, line 61, change "9" to --7--

Signed and Sealed this

Eighth Day of October 1985

[SEAL]

Attest:

Attesting Officer

DONALD J. QUIGG

Commissioner of Patents and Trademarks—Designate